C. A. HASKINS,
Assignor of one-third to E. SMITH.
Car Axle Box.
No. 9,613. Reissued March 22, 1881.
Fig I.
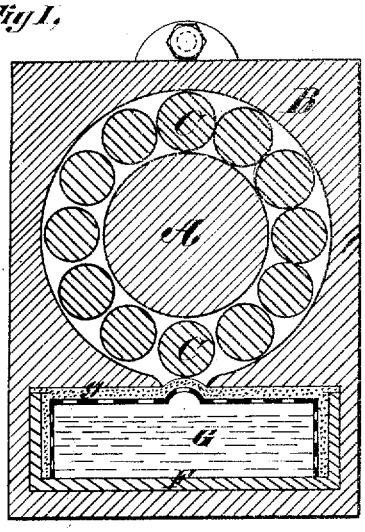
Fig III.
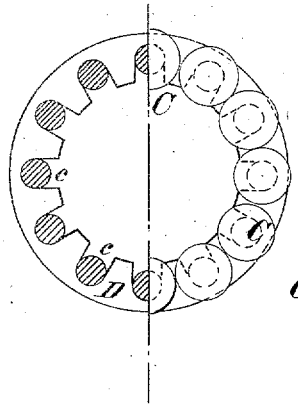
Fig IV.
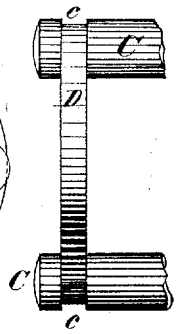
Fig II.
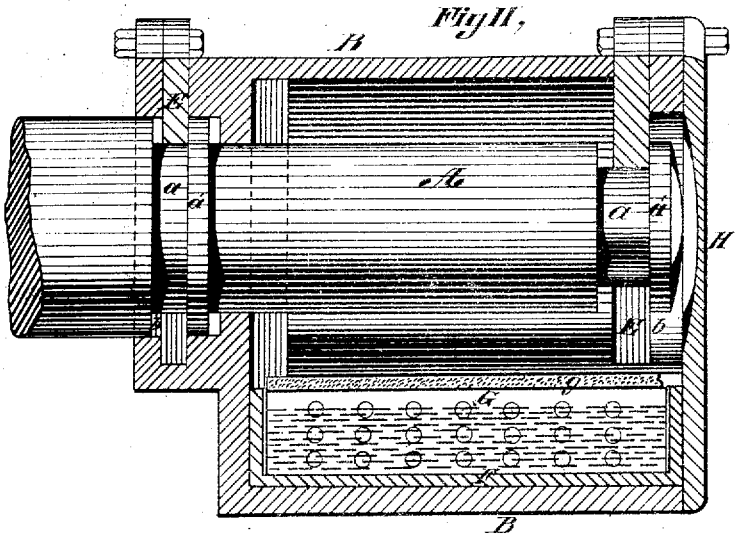
Fig V.
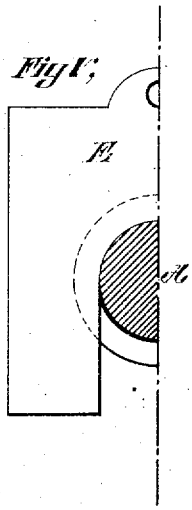
Witnesses,
F. L. Brown
Jason G. Clark
Inventor,
Charles A. Haskins,
By R. H. Hyde Atty.

UNITED STATES PATENT OFFICE.

CHARLES A. HASKINS, OF CHICAGO, ILLINOIS, ASSIGNOR OF ONE-THIRD TO ELIJAH SMITH, OF SAME PLACE.

CAR-AXLE BOX.

SPECIFICATION forming part of Reissued Letters Patent No. 9,613, dated March 22, 1881.

Original No. 127,163, dated May 28, 1872. Application for reissue filed September 13, 1880.

*To all whom it may concern:*

Be it known that I, CHARLES A. HASKINS, of Chicago, in the county of Cook and State of Illinois, have invented a new and useful Improvement in an Anti-Friction Journal-Box; and I do declare that the following is a true and accurate description thereof, reference being had to the accompanying drawings and to the letters of reference marked thereon, and being a part of this specification, in which—

Figure I is a cross-section through my improved journal-box and its journal. Fig II is a longitudinal section of the box, the anti-friction rollers and their rings being removed. Fig. III is a sectional end elevation of the anti-friction rollers and the slotted ring which holds them in place. Fig. IV is an elevation of the edge of one of these rings with the ends of two rollers in place, and Fig. V is a half elevation of one of the lateral-motion gates.

Similar letters of reference indicate corresponding parts in the several figures.

The nature of this invention relates to an improvement in that class of journal-boxes in which a series of anti-friction rollers is interposed between the journal and its bearing; and it consists in the peculiar device for lubricating the journal, rollers, and bearing, and in the peculiar gates employed for keeping the journal in the box, while allowing it sufficient lateral movement to accommodate the gage motion of the wheels and axle, the whole arranged and operating as more fully hereinafter set forth.

In the drawings, A represents the journal of a car-axle, and B is a square axle-box, cored out in molding, and bored out to receive the journal, but of sufficient diameter to allow of a series of encircling anti-friction rollers, C, to be interposed between them. These rollers have a journal, *c*, turned down at each end, which is received in a bearing formed at the bottom of one of the radial slots in a ring, D, at each end. These rings keep the rollers in position around the journal, and the whole series revolves slowly around the journal in the rotation of the latter, thereby producing only rolling friction between the journal and the bearing in the box, the advantage of which is too well understood to enlarge upon.

To lubricate the moving parts I form a chamber or compartment in the lower part of the box for the reception of oil, which is contained in a drawer, F, of sheet metal, which may be placed therein by removing the front cover, H, of the box. In this drawer or pan there is placed a sheet-metal plate, G, bent down at the ends to form a support, and has a longitudinal rib bent up along the center, to keep it nearly in contact with the lowermost roller above it. The plate G is perforated and covered with felt *g* on the top and ends, which felt cover is touched by each one of the rollers in the rings as it revolves by, and lubricated thereby, the oil being drawn up from the pan by capillary attraction, and thus supplied to the rollers, which, in turn, lubricate the journal and the bearing.

To keep the journal in its bearings and still allow the necessary lateral play to ease up the gage motion, I turn down in the outer end of the journal an annular recess, *d*, leaving a collar, *d'*, at the extremity of the axle. In the outer part of the shoulder of the axle I turn down a similar groove, leaving a like collar between it and the journal. Through the top of the box, at each end, there is a slot, down through which are dropped in each slot a gate, E, moving in slides *b* formed in the sides of the box, and received in a socket or recess at the bottom. The form of one-half a gate is shown in Fig. 5. Said gates are less in thickness than the width of the grooves *d*, which they are slotted out to embrace, or rather enter, embracing the diminished diameter of the journal.

The difference between the thickness of the gates and width of recess or grooves *d* is the play given the axle, as seen in Fig. 2, and may be varied to suit circumstances. The gates may be secured by a simple bolt through a lug at each end of the top of the box.

By removing the cover H of the box and withdrawing the gates any one or all of the rollers may be replaced in the rings by others without necessitating the removal of the axle, only requiring the box to be jacked up enough to relieve the pressure of the car on the rollers.

No cotton-waste or other material of the kind is required to insure the lubrication of the moving parts, with the exception of the light strip of felt mentioned and shown. Consequently where my improved journal-bearing is used there will be a large saving effected in this item alone, independent of the great reduction in friction and the renewal of brasses, as compared with the axle-boxes hitherto generally used.

In order that the felt strip may be touched by each successive roller as it revolves about the journal, the bore of the bearing in the box has cut through its bottom a longitudinal opening, as shown in Fig. I.

What I claim as my invention, and desire to secure by Letters Patent, is—

1. In a car-axle box, the combination, with the journal and an oil-chamber located beneath the journal and separated therefrom by a partition having an elongated opening therein, of the saturated capillary pad arranged to project up into the opening in the partition, closing the same and forming an extended lubricating-surface, substantially as and for the purpose herein described.

2. In car-axle boxes, the combination, with the compartment within the axle-box and with the partition separating it therefrom and provided with the longitudinal opening beneath the journal, of the perforated oil-containing drawer F, provided with the raised support to extend through the aperture below the journal A, covered with the felt *g* or equivalent capillary conductor, and made to fit snug within the case, whereby the oil is conducted to lubricate the axle-journal, and whereby the agitation of the oil through the motion of the car operates to distribute it through said perforations to the felt *g*, substantially as shown and described.

3. The drawer or receptacle F, perforated plate G, and felt strip *g*, in combination with the series of rollers C and rings D, as and for the purpose set forth.

4. In car-axle boxes, the combination, with an annular recess upon the outer end of the journal and with the box, of the gate E, formed to straddle the journal in said recess and extend upon each side of it, to key it and the box together, substantially as shown and described.

5. The combination, with the box B, having the gates E combined and arranged therewith, substantially as shown and described, of the axle-journal provided with the annular channels *d*, of greater width than the thickness of the gates, to permit the longitudinal play of the journal within the box, as shown and described.

CHARLES A. HASKINS.

Witnesses:

NORMAN WADE,

PETER J. LADD.